Feb. 18, 1964  B. M. CALDWELL  3,121,322
APPARATUS FOR TESTING EXPLOSIVE DEVICES
BY STEREOSCOPIC PHOTOGRAPHY
Filed Jan. 25, 1961  3 Sheets-Sheet 1

INVENTOR
Blake M. Caldwell

BY John O. Evans, Jr.
ATTORNEY

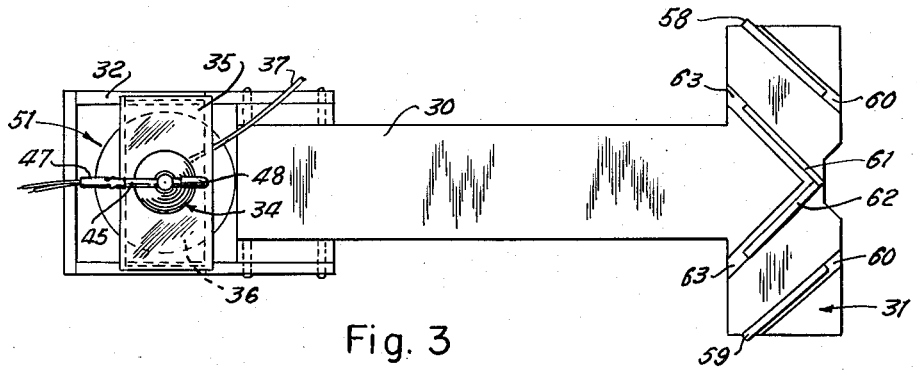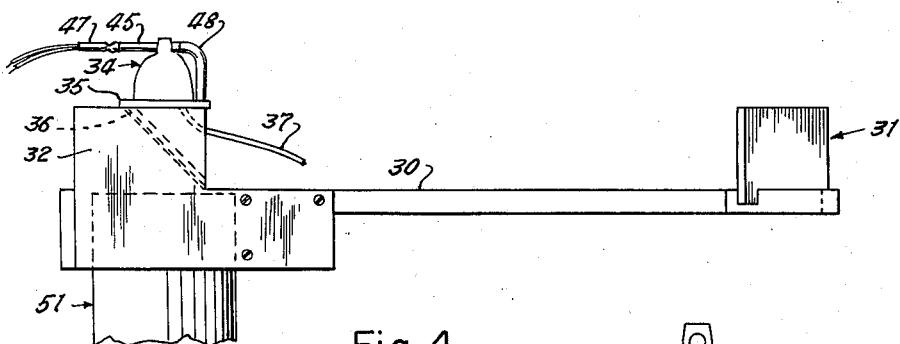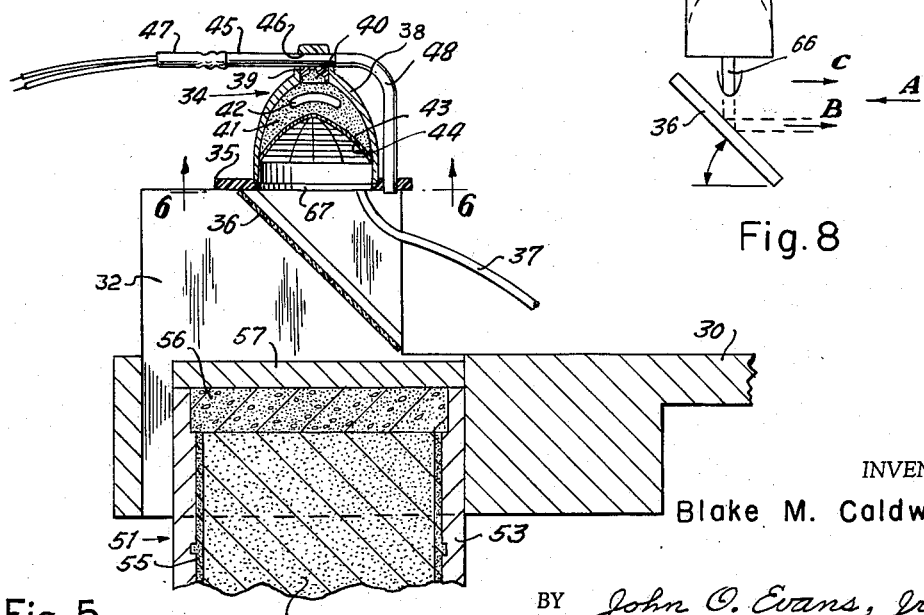

Feb. 18, 1964

B. M. CALDWELL 3,121,322

APPARATUS FOR TESTING EXPLOSIVE DEVICES
BY STEREOSCOPIC PHOTOGRAPHY

Filed Jan. 25, 1961

INVENTOR
Blake M. Caldwell

BY *John O. Evans, Jr.*

ATTORNEY

United States Patent Office 3,121,322
Patented Feb. 18, 1964

3,121,322
APPARATUS FOR TESTING EXPLOSIVE DEVICES BY STEREOSCOPIC PHOTOGRAPHY
Blake M. Caldwell, Fort Worth, Tex., assignor to Jet Research Center, Inc., Arlington, Tex., a corporation of Texas
Filed Jan. 25, 1961, Ser. No. 84,887
7 Claims. (Cl. 73—35)

This invention relates to an apparatus for testing lined shaped charge explosive devices by stereoscopically photographing the collapse of the liner and observing the jet perforation in a target.

The essence of the jet formation process is the progressive collapse of the cavity liner. A dozen or more different characteristics of a shaped charge unit affect the behavior of the cavity liner. These include the axial symmetry of every component and the entire assembly; the chemistry, thickness, distribution and density of the explosive material; the mass of the confining charge case; the geometry of the cavity; the material of which the liner is made; the shape, direction, and velocity of the detonation front at all points on the liner; etc. These characteristics combine to deliver a forward impulse to the liner, and the resulting motion depends upon the relation between the available impulse and the mass of the liner at every point.

The material, shape, and thickness of the liner are usually determined by target tests. The impulse delivered to the liner is the resultant of many interdependent conditions. The local impulse can be calculated if the velocity can be measured and if the thickness (mass) of the liner at every point is known.

The high-speed framing camera may be used to measure velocities in directions perpendicular to its optical axis, and it will support a qualitative analysis of the collapse of a cavity liner. However, since it is not sensitive to axial displacements, any conclusions about true motions in three-dimensional space are implicit rather than explicit. A new stereoscopic technique employing a special supplementary optical system has been developed to give the high-speed framing camera the ability to record motion in a manner permitting calculation of original directions and velocities in three-dimensional space. Such a method and apparatus are described in the copending application for U.S. patent of Norman R. Zabel and David E. Brink (deceased), Serial No. 848,476, filed October 23, 1959 for "Method for Studying Explosions Stereoscopically," now Patent No. 3,074,170, issued Jan. 22, 1963, which patent is assigned to the assignee of the present application.

The present invention concerns an improved subassembly of the apparatus described in the before-mentioned copending application which permits positioning the lined shaped charge explosive device under test adjacent a target to be perforated by the jet produced by the collapse of the liner of the shaped charge. The subassembly also provides an improved mounting arrangement for the stereo-image optical system.

An object of the invention is to provide an improved assembly for obtaining data to provide correlation of the design characteristics of a lined shaped charge explosive device with the penetration of the explosively formed jet into a test target.

Another object of the invention is to provide an improved assembly for positioning a lined shaped charge explosive device adjacent a target to be perforated by the jet from the shaped charge after the collapse of the liner has been photographed stereoscopically.

A still further object of the invention is to provide an improved subassembly in an apparatus for stereoscopically photographing the collapse of a lined shaped charge explosive device.

A further object of the invention is to provide an improved mounting arrangement for the stereo-image optical system in an apparatus for stereoscopically photographing the collapse of a lined shaped charge explosive device.

These and other objects, aims and advantages of the invention are realized in an apparatus for testing lined shaped charge explosive devices which includes a support member, a plane relay mirror carried by the support member, and means for positioning a shaped charge explosive device to direct its jet through the mirror at a substantial angle to the normal of said mirror. The shaped charge device has an open front end and a cavity liner which is visible through the open front end. A test target is located on the opposite side of the mirror from the shaped charge device and positioned to be hit by the jet produced upon detonation of the shaped charge device after the jet has penetrated the mirror. Means including a camera are positioned to view the liner of the shaped charge device by reflection from the mirror for making a photographic record of the collapse of the liner upon detonation of the shaped charge device.

The objects relating to an improved subassembly for use in apparatus for testing lined shaped charge explosive devices are realized in a subassembly including a frame having opposite openings therein, and a plane relay mirror mounted in the frame at a substantial angle to the axis extending through the opposite openings in the frame. Means are provided positioning a shaped charge explosive device at one of the openings in the frame to direct its jet through the mirror along a line substantially parallel to the axis extending through the opposite opening in the frame. The shaped charge has an open front end and a cavity liner visible through the open front end. A test target is located at the other end of the opening in the frame and positioned to be hit by the jet produced upon detonation of the shaped charge device after the jet has penetrated the mirror. Stereoscopic photographic means is provided including a stero-optical system located a substantial distance to one side of the axis of the jet, and a high-speed framing camera positioned to view the liner of the shaped charge device through the stereo-optical system by reflection from the mirror for making a stereoscopic photographic record of the collapse of the liner upon detonation of the shaped charge device.

In the drawings:

FIG. 3 is an enlarged plan view of the improved subassembly embodied in the apparatus of FIGS. 1 and 2 showing a lined shaped charge explosive device positioned for testing;

FIG. 4 is a side elevational view of the subassembly of FIG. 3;

FIG. 5 is an enlarged vertical sectional view of a portion of the subassembly of FIGS. 3 and 4;

FIG. 8 is a diagrammatic view of a portion of the apparatus indicating the direct and reflected images of the jet as seen by the high-speed camera.

Figure 1:
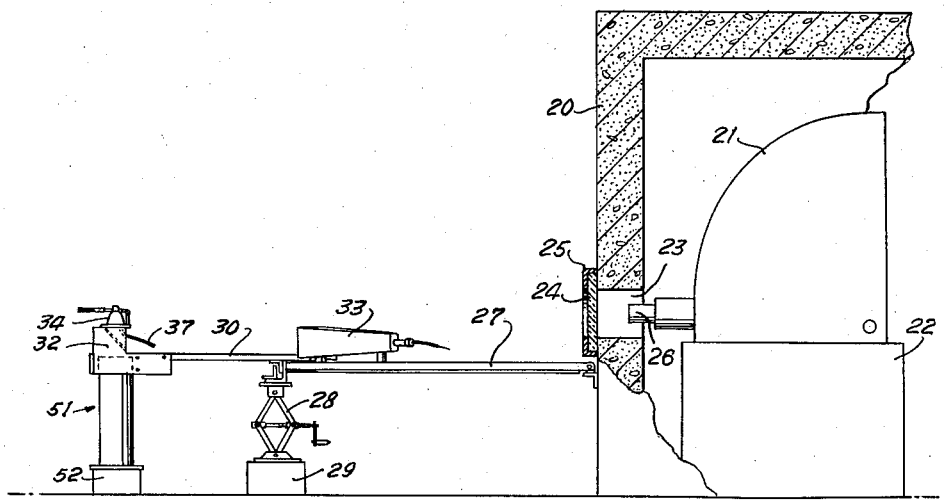
FIG. 1 is a side elevational view, partially in section, of exemplary apparatus for making stereoscopic photographs of the collapse of a liner in a shaped charge explosive device which includes an improved subassembly in accordance with the present invention.
Figure 2:
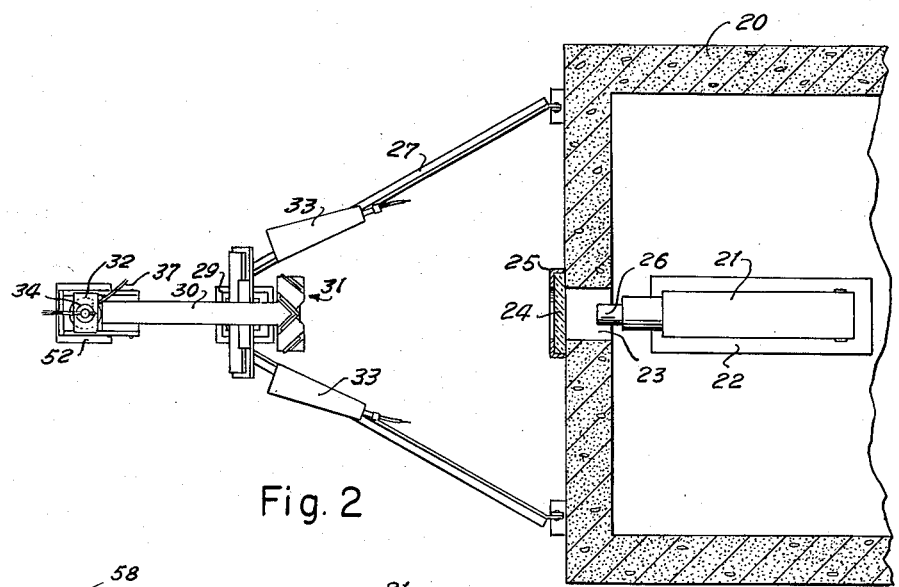
FIG. 2 is a plan view, partially in section, of the apparatus of FIG. 1.

Referring to FIGS. 1 and 2 of the drawings, the stereoscopic photographic apparatus shown includes a bombproof 20 enclosing a high-speed framing camera 21 mounted on a base 22. The bombproof has a port 23 covered by a piece of explosion-proof glass 24 mounted in a frame 25 on the front wall of the bombproof. The objective 26 of the camera is pointed out through the port 23.

A horizontal A-frame 27 has its legs pivotally supported on the front wall of the bombproof. A jack 28 resting on a base 29 supports the vertex of the frame above the ground. A T-head support member or arm 30 is horizontally fixed to the vertex of the A-frame with the T-head between the legs of the A-frame. A stereoscopic mirror system 31 is vertically mounted on the T-head of the support member. A rectangular charge mounting frame 32 is fixedly mounted on the opposite end of the T-head support member.

Intense illumination is required for making the photographs under the extremely short exposure conditions that are necessary where a number of separate exposures are made in a matter of a few microseconds. Such illumination is supplied by a pair of argon bombs 33 mounted on the A-frame.

Referring now to FIGS. 3 to 5 of the drawings, the improved subassembly shown includes the T-head support member 30 with the stereoscopic mirror system 31 mounted at one end and the charge mounting frame 32 at the other end. A shaped charge explosive device 34 is centrally positioned over the open top of frame 32. A grid plate 35 of Lucite (a polymerized methyl methacrylate resin), which provides a shouldered opening 67 therein to receive the front end of the charge case, extends across the open top of the frame to support the shaped charge device in the proper position. A plane relay mirror 36 is mounted within the frame 32 at an angle of 45 degrees to the axis of the shaped charge and in a position to be perforated by the jet formed by the detonation of the lined shaped charge device. The mirror 36 is positioned to project an image of the grid plate 35 and the lined cavity of the shaped charge 34 transversely through an open side of the frame 32 toward the stereo-mirror system 31. The relay mirror is silvered on its front surface which faces the shaped charge device. A mirror thickness of 0.040 inch has been found satisfactory in that it produces very little disturbance of the jet when penetrating the mirror.

A flexible hose 37 extends underneath the grid plate and is positioned to direct a stream of helium or butane from a source (not shown) into the cavity of the shaped charge device 34. It is necessary to purge the cavity of the shaped charge with a gas that does not emit light when subjected to the shock of the explosion to permit obtaining a clear view of the collapsing charge liner. Air emits light when subjected to the shock forces of an explosion. Gases other than helium or butane may be used, but these two gases are preferred.

Figure 9:
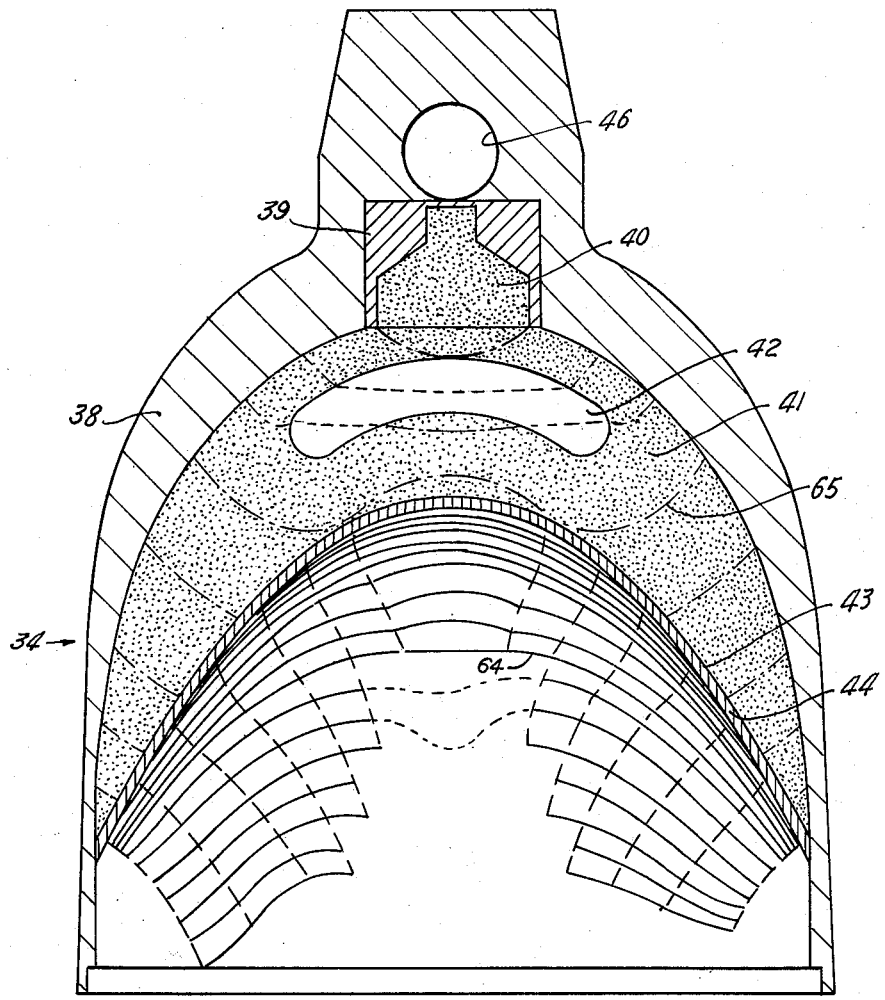
FIG. 9 is an axial sectional view of a lined shaped charge explosive device showing the plotted positions of the collapsing liner.
Figure 6:
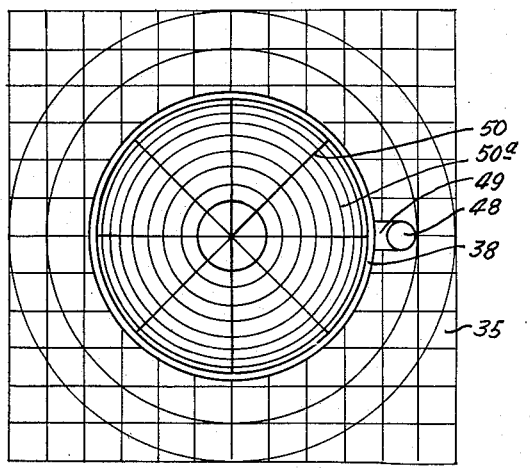
FIG. 6 is a sectional view of the shaped charge device and grid member taken along line 6—6 of FIG. 5.

Referring now to FIGS. 5, 6 and 9, the shaped charge device 34 may be of any desired type but is specifically shown as having a metal case 38 in the form of a body of rotation symmetrical about a vertical axis. A booster cup 39 is axially received in the case near the base thereof and a booster charge 40 is seated in the booster cup. The main explosive charge 41 is seated in the case forwardly of the booster charge and a barrier 42 of metal is embedded in the main explosive charge and positioned transversely and symmetrically of the axis. The front face 43 of the main charge is hollow and provides an ellipsoidal cavity symmetrical about the axis. The cavity is lined with a thin copper liner 44 of corresponding ellipsoidal shape.

The booster is detonated sympathetically by a length of Primacord fuse 45 received in the passage 46 in the rear of case 38. The Primacord is detonated by an electric blasting cap 47 at one end of the fuse. Abutting the other end of the Primacord fuse is an L-shaped, cylindrical rod 48 of clear Lucite having its distal end extending through an opening 49 in the grid plate 35, as can be seen in FIG. 6. The distal end of the rod is positioned close to the charge case 38 and is visible in the field of view of the high-speed camera.

The concave side of the liner 44 is preferably given a thin plating of cadmium or other coating which will provide a highly reflective surface to enhance the illumination of the shaped charge cavity during the time the liner collapse is photographed. As best seen in FIG. 6, the charge liner is marked with India ink, or other suitable material, to provide points of reference that show clearly in the stereoscopic photographs. Radial lines 50 spaced at 45 degree intervals extend outwardly from the axis of the charge along the inner surface of the liner. Circular lines 50a are drawn circumferentially about the inner surface of the liner to intersect the radial lines. The circular lines 50a define parallel planes that intersect the axis of the shaped charge device at right angles and at equally spaced points therealong.

Referring now to FIG. 5, a cylindrical target 51 extends up into the open bottom of the frame 32. The target rests on a base 52, as can be seen in FIG. 1. The target is positioned coaxially with the shaped charge unit 34 below the mirror 36 to be perforated by the jet formed by detonation of the shaped charge device. A section of heavy wall steel pipe 53 serves as the container for the Berea sandstone core 54 which is bonded to the pipe by a filler 55 of low melting point metal alloy or "Hydromite," a resin gypsum plastic binder. A layer of cement 56 covers the top surface of the target core and a face plate 57 of mild steel is welded or otherwise attached to the top of the pipe 53. The components of the target that are perforated by the jet are representative of the actual materials that a jet would perforate when fired through a cemented string of casing in an oil well borehole into the surrounding earth formation. It is to be understood that the above-described target is merely exemplary and that targets having other forms or made of different materials may be used.

Referring again to FIG. 3, the stereoscopic mirror system 31 includes a pair of stereo-object mirrors 58 and 59 vertically mounted in grooves 60 in the T-head of support member 30. The mirrors 58 and 59 are spaced at equal distances on opposite sides of the longitudinally extending axis of the support member 30, which axis intersects the vertically extending jet axis of the shaped charge explosive device 34. The mirrors are silvered on their front surfaces that face the plane relay mirror 36. The stereo-object mirrors 58 and 59 receive the image of the shaped charge device cavity liner 44 and grid plate 35 which is reflected from the inclined plane relay mirror 36 and, in turn reflect separate images toward the axis of the support member 30.

A pair of collimating mirrors 61 and 62 are vertically mounted in grooves 63 nearer the axis of the support member 30. The collimating mirrors are silvered on their front surfaces which face the stereo-object mirrors. The collimating mirrors are set at an angle to the axis of the support member which is appropriate to provide parallelism of the rays reflected therefrom to the camera. In the apparatus shown, these mirrors are disposed at 45 degree angles to the horizontal axis of the support member.

Figure 7:
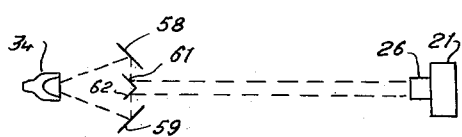
FIG. 7 is a diagrammatic view of a part of the stereo-optical system of the exemplary apparatus.

FIG. 7 is a diagrammatic view showing in dotted lines the paths taken by the reflected images of the shaped charge 34 from the relay mirror to the stereo-object mirrors 58 and 59; then to the collimating mirrors 61 and 62; and then along parallel lines to the objective 26 of the camera 21.

The high-speed framing camera may be of the type generally disclosed in U.S. Patent No. 2,400,887, issued May 28, 1946 to C. D. Miller for "High-Speed Motion Picture Camera."

In operation, the apparatus is set up as shown in FIGS. 1 and 2. The shaped charge explosive device 34 to be tested is placed in the opening in the grid plate 35 with the blasting cap and Primacord attached thereto. The target 51 is placed on the base 52 and positioned centrally under the shaped charge device within frame 32. The jack 28 is raised or lowered to move the frame 32 to obtain the desired standoff distance between the shaped charge device and the top surface of the target. The argon bombs 33 are made ready for firing to illuminate the shaped charge cavity and grid plate. When all preparations are made, the argon bombs are fired and, during the period of illumination, the shaped charge device is detonated and the collapse of the liner is photographed by the camera 21. The camera will produce a series of, say, twenty-five exposures of the shaped charge liner as it collapses with the exposures being made at equal, known time intervals.

One of the frames of the photographic film shows the end of the Lucite rod 48 as being illuminated. This marks the time at which the detonation wave in the Primacord 45 reaches the abutting end of the Lucite rod. This frame may be taken as the zero reference frame. It is exposed approximately at the time at which the detonation of the main explosive charge of the shaped charge device begins. The time interval between successive frames on the photographic film is known from the geometry of the camera and the speed of the rotating mirrors within the camera. In a later frame of the photographic record; disturbances will be observed in the liner as it begins to collapse under the attack of the detonation wave from the explosive charge. Still later frames of the photographic record will show later stages in the collapse of the liner. The collapse of the liner can be observed through a number of successive frames of the film and valuable information thus obtained concerning the actual velocity and direction of each observed element of the liner.

When the shaped charge is fired, the jet perforates the relay mirror 36 and then perforates the target 51. After the charge is fired, the target is removed and physical measurements of the perforation produced by the jet from the detonating shaped charge device are taken for correlation with the design characteristics of the shaped charge device and the stereoscopic record. Measurements taken will usually include the entrance hole diameter, depth of clean perforation, total depth of perforation and volume of the perforation in the Berea sandstone core. The core may be removed from the pipe jacket. If desired, the core may be cut in half longitudinally to permit study and/or photographing of the shape of the perforation within the core.

The extraction of physical measurements from the photographic record is done graphically. A projector apparatus delivers an enlarged stereoscopic image from the developed film to a ground glass screen. A plotting apparatus is used to produce a frame-by-frame series of plots defining a succession of shapes characteristic of the liner during the collapse phase at intervals equivalent to the framing interval of the camera during the test. Apparatus for projecting the filmed stereo-images and plotting the shapes of the collapsing liner is described in detail in the before-mentioned patent and reference is made thereto for a more complete description of the principles involved and construction of such apparatus.

Referring to FIG. 9, a plot made from successive frames of the framing camera film is superimposed on an enlarged drawing showing the construction of the shaped charge device tested. Each curved line 64 gives the position of the collapsing liner at successive 0.7 micro-second intervals. It can be seen that, after the ninth line plotted, the lines are thereafter discontinuous. This is due to gases from the charge which obscure the surface of the liner 44. The dotted lines 65 are plots of the positions of the detonation front at successive intervals of 0.5 microsecond as it moves through the explosive charge 41. The velocity of the liner material forming the jet can thus be readily determined. Plots of the jet tip (not shown) may be conveniently made to determine the direction of the jet.

Where the lines 64 are discontinuous, it is often possible to approximate the positions of the liner elements that cannot be plotted by viewing the corresponding stereoscopic pair of photographs through an ordinary stereoscopic viewer and visually estimating the positions of many of the elements that are not entirely obscured by gases. From such visual estimates, the gaps in the lines may be filled in with a fair degree of accuracy.

The improved subassembly of the present invention provides an additional advantage in that it makes possible the direct determination of the jet tip velocity in addition to that derived from the plotted data taken from the photographs. Referring now to FIG. 8, upon detonation of the shaped charge 34, the framing camera views the relay mirror 36 along the line indicated by arrow A where it photographs the collapse of the liner 44 and formation of the jet 66 as reflected along the line indicated by arrow B. As long as the jet 66 is within the hollow cavity of the exploding shaped charge device in the inert helium atmosphere, it forms no visible shock wave. When the jet 66 emerges from the cavity, it contacts an atmosphere of air and produces a luminous shock wave, which is recorded directly on the camera film along the line indicated by arrow C. If the camera speed is such that it photographs two or more frames between the time the jet leaves the shaped charge cavity and perforates the mirror 36, it is possible to measure the distance the tip moved between two frames and thus determine its velocity.

The improved subassembly permits obtaining data from a shaped charge explosive device by stereophotographic techniques during the critical phase in the generation of the jet and, in addition, permits the jet to perforate a target to provide data on penetration for correlation with significant charge design characteristics.

Various modifications of the apparatus will occur to persons skilled in the art without departing from the scope and spirit of the invention. For example, the so-called smear camera may be used to photograph the collapse of the liner. Prisms may be used instead of mirrors in the stereo-optical system. A stack of steel plates may be used for a target, or any other material in which it is desired to obtain penetration data.

I claim:

1. In apparatus for testing lined shaped charge explosive devices, the combination comprising: a support member; a plane relay mirror carried by said support member; means for positioning a shaped charge explosive device to direct its jet through said mirror at a substantial angle to the normal of said mirror, the shaped charge having an open front end and a cavity liner visible through said open front end; a test target located on the opposite side of said mirror from the shaped charge device and positioned to be hit by the jet produced upon detonation of the shaped charge device after the jet has penetrated said mirror; and stereoscopic photographic means including a stereo-optical system located a substantial distance to one side of the axis of the jet, and a camera positioned to view the liner of the shaped charge device through said stereo-optical system by reflection from said mirror for making a stereoscopic photographic record of the collapse of the liner upon detonation of the shaped charge device.

2. In apparatus for testing lined shaped charge explosive devices, the combination comprising: a frame having opposite openings therein; a plane relay mirror mounted in said frame at a substantial angle to the axis extending through the opposite openings in said frame; means positioning a shaped charge explosive device at one of the openings in said frame to direct its jet through said mirror along a line substantially parallel to the axis extending through the opposite openings in said frame, the shaped charge having an open front end and a cavity liner visible through said open front end; a test target located at the other of the openings in said frame and positioned to be hit by the jet produced upon detonation of the shaped charge device after the jet has penetrated said mirror; and stereoscopic photographic means including a stereo-optical system located a substantial distance to one side of the axis of the jet, and a high-speed framing camera positioned to view the liner of the shaped charge device through said stereo-optical system by reflection from said mirror for making a stereoscopic photographic record of the collapse of the liner upon detonation of the shaped charge device.

3. In an apparatus for testing lined shaped charge explosive devices, the combination comprising: a frame having an open top, an open bottom and an opening provided in at least one side; a rigid grid member positioned across the open top of said frame, said grid member providing a central opening therethrough and supporting a shaped charge explosive device having an open front end and a cavity liner which is visible through the opening in said grid member; a plane relay mirror mounted in said frame at a substantial angle to the axis of the shaped charge which axis passes through said mirror, and said mirror positioned to reflect the image of the shaped charge cavity liner and grid member through the opening provided in said one side of said frame; a transverse arm fixedly attached to said frame, said arm being attached to said side of said frame which provides said opening therethrough; a test target located adjacent the bottom opening in said frame and positioned to be hit by the jet produced upon detonation of the shaped charge device after the jet has penetrated said mirror; and stereoscopic photographic means including a stereo-optical system affixed to said arm a substantial distance to one side of the axis of the jet, and a high-speed framing camera positioned to view the liner of the shaped charge device through said stereo-optical system by reflection from said mirror for making a stereoscopic photographic record of the collapse of the liner upon detonation of the shaped charge device.

4. In an apparatus for testing lined shaped charge explosive devices, the combination comprising: a generally rectangular frame having opposite open ends and an opening in at least one side; a flat rigid grid plate positioned across one of the open ends of said frame, said grid plate providing a central opening therethrough and supporting a shaped charge explosive device having an open front end and a cavity liner which is visible through the opening in said grid plate; a plane relay mirror mounted within said frame at an angle of substantially 45 degrees to the longitudinal axis of the shaped charge device to reflect the image of the shaped charge cavity liner through the open side of said frame; a transverse arm fixedly attached to said frame on the side providing an opening therein and extending along a line substantially perpendicular to the longitudinal axis of the shaped charge; a test target located at the other of the open ends of said frame and positioned to be hit by the jet produced upon detonation of the shaped charge device after the jet has penetrated said mirror; and stereoscopic photographic means including a stereo-optical system affixed to said arm a substantial distance to one side of the axis of the jet, and a high speed framing camera positioned along the same line as said transverse arm to view the liner of the shaped charge device through said stereo-optical system by reflection from said mirror for making a stereoscopic photographic record of the collapse of the liner upon detonation of the shaped charge device.

5. A subassembly for use in apparatus for testing lined shaped charge explosive devices comprising: a frame having opposite openings therein; means carried by said frame for supporting and positioning a lined shape charge explosive device over one of said openings in said frame to direct the jet formed upon detonation through the other of said openings; a plane relay mirror mounted in said frame between said openings at an acute angle to the jet axis of the shaped charge to permit a full view of the shaped charge liner; a test target located at the other of said openings and positioned to be hit by the jet produced upon detonation of the shaped charge device after the jet has penetrated said mirror; a transverse arm attached to said frame and extending to one side thereof along a line providing a view of the reflecting surface of said mirror; and a stereo-optical system mounted on said transverse arm a substantial distance from the jet axis of the shaped charge to view the shaped charge liner by reflection from said mirror and to project a stereo-pair of images of the liner of the shaped charge device to be photographed by a high-speed camera.

6. A subassembly for use in apparatus for testing lined shaped charge explosive devices comprising: a generally rectangular frame having opposite open ends and an opening in at least one side; a grid plate positioned across one of the open ends of said frame, said grid plate providing a central opening therethrough and supporting a shaped charge explosive device having an open front end and a cavity liner which is visible through the opening in said plate, the shaped charge device being positioned to direct the jet formed upon detonation through the other of said open ends; a plane relay mirror mounted in said frame between said open ends at an acute angle to the jet axis of the shaped charge to reflect the image of the shaped charge cavity liner through said open side of said frame; a test target located at the other of said open ends of said frame and positioned to be hit by the jet produced upon detonation of the shaped charge device after the jet has penetrated said mirror; a transverse arm attached to said frame on the side providing an opening therethrough and extending substantially perpendicular to the jet axis of the shaped charge; and a stereo-object mirror assembly mounted on said transverse arm a substantial distance from the jet axis of the shaped charge to view the shaped charge liner by reflection from said mirror and to project a stereo-pair of images of the liner of the shaped charge device to be photographed by a high-speed camera.

7. Apparatus for testing lined shaped charge explosive devices by photographically recording the progress of the collapse of the charge liner from which record the tip velocity of the jet produced by the explosive forces acting upon the charge liner may be determined by two separate and independent methods of calculation, said apparatus including: means to support and position the lined shaped charge device under test; a relay mirror positioned in front of the forward end of the shaped charge at an acute angle to the jet axis of the shaped charge to reflect the image of the charge liner along a line substantially perpendicular to the jet axis; a stereo-optical system located a substantial distance from the jet axis along the line of the reflected image projected by said relay mirror; a high-speed framing camera positioned to record the stereo-images projected by said stereo-optical system; and the spacing of said relay mirror from the open front end of the shaped charge device and the speed of said camera being so coordinated to provide for exposure of at least two successive frames of film on which are recorded the direct reflection from said stereo-system of the positions of the luminous tip of the jet produced during the interval of time between the passage of the tip of the jet out of the front end of the detonating shaped charge unit and impact and destruction of said relay mirror by the tip of the jet.

References Cited in the file of this patent
UNITED STATES PATENTS

| | | |
|---|---|---|
| 1,489,566 | Webster | Apr. 8, 1924 |
| 1,585,129 | Smith | May 18, 1926 |
| 2,323,301 | Anderson | July 6, 1943 |